(12) United States Patent
Hawighorst et al.

(10) Patent No.: US 11,091,329 B2
(45) Date of Patent: Aug. 17, 2021

(54) CONVEYING DEVICE, SYSTEM FOR STACKING FILLED BAGS, AND METHOD FOR STACKING FILLED BAGS

(71) Applicant: Windmöller & Hölscher KG, Lengerich (DE)

(72) Inventors: Thomas Hawighorst, Hasbergen (DE); Rafael Imberg, Ibbenbüren (DE); Timo Raude, Osnabrück (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days.

(21) Appl. No.: 16/486,007

(22) PCT Filed: Dec. 19, 2017

(86) PCT No.: PCT/EP2017/083548
§ 371 (c)(1),
(2) Date: Aug. 14, 2019

(87) PCT Pub. No.: WO2018/149540
PCT Pub. Date: Aug. 23, 2018

(65) Prior Publication Data
US 2020/0048018 A1 Feb. 13, 2020

(30) Foreign Application Priority Data

Feb. 15, 2017 (DE) .................. 10 2017 103 089.1

(51) Int. Cl.
*B65G 57/06* (2006.01)
*B65G 47/51* (2006.01)
*B65G 57/14* (2006.01)

(52) U.S. Cl.
CPC ......... *B65G 57/06* (2013.01); *B65G 47/5186* (2013.01); *B65G 57/14* (2013.01); *B65G 2203/042* (2013.01); *B65G 2814/0305* (2013.01)

(58) Field of Classification Search
CPC .... B65G 57/06; B65G 47/5186; B65G 57/14; B65G 2203/042; B65G 2814/0305;
(Continued)

(56) References Cited

U.S. PATENT DOCUMENTS 2,655,271 A * 10/1953 Cole .................... B65G 47/086
414/792
2,971,659 A * 2/1961 Miller, Jr. ............ B65G 47/086
414/792.4

(Continued)

FOREIGN PATENT DOCUMENTS

| CN | 104444400 A | 3/2015 |
| CN | 103764523 B | 8/2016 |

(Continued)

OTHER PUBLICATIONS

Xu, "Reconfigurable High-Speed Palletizing and Loading System for Bagged Cement", Aug. 2-5, 2015, 2015 IEEE International Conference on Mechatronics and Automation (ICMA), available at https://ieeexplore.IEEE.org/abstract/document/7237455. (Year: 2015).*

(Continued)

*Primary Examiner* — Gregory W Adams
(74) *Attorney, Agent, or Firm* — Rudy J. Ng; Bret E. Field; Bozicevic, Field & Francis LLP

(57) ABSTRACT

The invention concerns a conveying device (10) for conveying filled bags (1, 2), comprising a conveying unit (13) by which at least part of a conveying path (3) for conveying filled normal bags (1) can be formed from a feeding station (101) to a stacking area (105).

(Continued)

The invention also concerns a system (100) for stacking filled bags (1, 2) and a method for stacking filled bags (1, 2).

18 Claims, 5 Drawing Sheets

(58) Field of Classification Search
CPC .. B65G 47/5145; B65G 47/684; B65G 61/00; B65G 47/086; B65G 57/005; B65G 57/24; B65G 57/10; B65G 1/1378; B65G 57/26; B65D 71/0088; Y10S 198/954; Y10S 414/116; Y10S 209/933; Y10S 209/917; Y10S 414/11; Y10S 414/10; B07C 5/36; B07C 5/06
USPC .......................................................... 414/931
See application file for complete search history.

(56) References Cited

U.S. PATENT DOCUMENTS

| | | | | | |
|---|---|---|---|---|---|
| 3,007,585 | A | * | 11/1961 | Geisler | B65G 57/00 414/792.3 |
| 3,294,257 | A | * | 12/1966 | Davies | B65G 47/086 414/792 |
| 3,587,876 | A | * | 6/1971 | Dahlem | B65G 47/086 414/789.1 |
| 4,000,820 | A | * | 1/1977 | Kurk | B65G 47/086 414/791.8 |
| 4,724,656 | A | * | 2/1988 | Tanaka | B65B 3/24 141/128 |
| 4,959,947 | A | * | 10/1990 | Reif | B65B 1/12 53/502 |
| 6,076,683 | A | * | 6/2000 | Okada | B07C 1/00 209/577 |
| 6,412,621 | B1 | * | 7/2002 | De Vree | B65G 37/02 198/347.4 |
| 8,397,898 | B2 | * | 3/2013 | Buchmann | B65G 47/5186 198/347.4 |
| 8,423,178 | B2 | * | 4/2013 | Baumann | B65G 1/1378 700/217 |
| 8,615,386 | B2 | * | 12/2013 | Baldes | B65G 57/00 703/7 |
| 2004/0223839 | A1 | * | 11/2004 | Simkowski | B65G 47/086 414/791.6 |
| 2008/0260513 | A1 | | 10/2008 | Lalesse et al. | |
| 2011/0076128 | A1 | * | 3/2011 | Johnsen | B65G 21/14 414/791.6 |
| 2012/0118699 | A1 | | 5/2012 | Buchmann et al. | |
| 2013/0184854 | A1 | * | 7/2013 | Bastian, II | B65G 61/00 700/217 |
| 2014/0088748 | A1 | | 3/2014 | Woodtli et al. | |
| 2015/0210409 | A1 | * | 7/2015 | Berger | B65B 1/04 53/436 |
| 2015/0307290 | A1 | * | 10/2015 | Kohn | B65B 11/025 206/598 |
| 2015/0307291 | A1 | * | 10/2015 | Kolker | B65G 57/03 414/792.6 |
| 2015/0307294 | A1 | * | 10/2015 | Kolker | B65G 57/09 414/792 |
| 2016/0362202 | A1 | * | 12/2016 | Hawighorst | B65B 43/465 |

FOREIGN PATENT DOCUMENTS

| | | | | |
|---|---|---|---|---|
| DE | 1611686 | A1 | 1/1971 | |
| DE | 2500077 | A1 | 7/1976 | |
| DE | 3830692 | A1 | 3/1990 | |
| DE | 19508911 | A1 | 9/1996 | |
| DE | 19508911 | A1 * | 9/1996 | ............ B65G 61/00 |
| DE | 102007038834 | A1 | 2/2009 | |
| DE | 202007018783 | U1 | 5/2009 | |
| DE | 102008036564 | A1 | 2/2010 | |
| DE | 102011017111 | A1 | 10/2012 | |
| DE | 102013101750 | A1 | 8/2014 | |
| DE | 102014105934 | A1 | 10/2015 | |
| DE | 102014105936 | A1 | 10/2015 | |
| EP | 0106019 | A2 | 4/1984 | |
| EP | 2511204 | A1 | 10/2012 | |
| EP | 2939962 | A1 | 11/2015 | |
| EP | 2939963 | A1 | 11/2015 | |
| FR | 2370664 | A1 | 6/1978 | |
| JP | 2010202291 | A | 9/2010 | |
| WO | WO2010012364 | A1 | 2/2010 | |
| WO | WO2012024714 | A2 | 3/2012 | |

OTHER PUBLICATIONS

International Preliminary Report on Patentability for PCT Application No. PCT/EP2017/083548 dated Aug. 6, 2019, with its English translation, 18 pages.
Office Action for German Application No. 10 2017 103 089.1 dated Oct. 18, 2019, and its English summary, 8 pages.
Office Action for German Patent Application No. 10 2017 103 089.1 dated Jan. 17, 2018, and its English summary, 14 pages.
Office Action for German Patent Application No. 10 2017 103 089.1 dated May 27, 2019, and its English summary, 9 pages.
Partial Search Report for PCT Patent Application No. PCT/EP2017/083548 dated Mar. 16, 2018, and its English summary, 19 pages.
International Search Report for PCT Patent Application No. PCT/EP2017/083548 dated Jun. 7, 2018, 23 pages.
Rule 66 PCT form for PCT Patent Application No. PCT/EP2017/083548 dated May 3, 2019, and its English summary, 8 pages.
First Office Action for Chinese Application No. 201780086505.6 dated Jul. 15, 2020, with its English translation, 22 pages.
Office Action for German Application No. 10 2017 103 089.1 dated Feb. 5, 2021, with its English translation, 8 pages.
Second Office Action for Chinese Application No. 201780086505.6 dated Apr. 14, 2021, with its English translation, 12 pages.

* cited by examiner

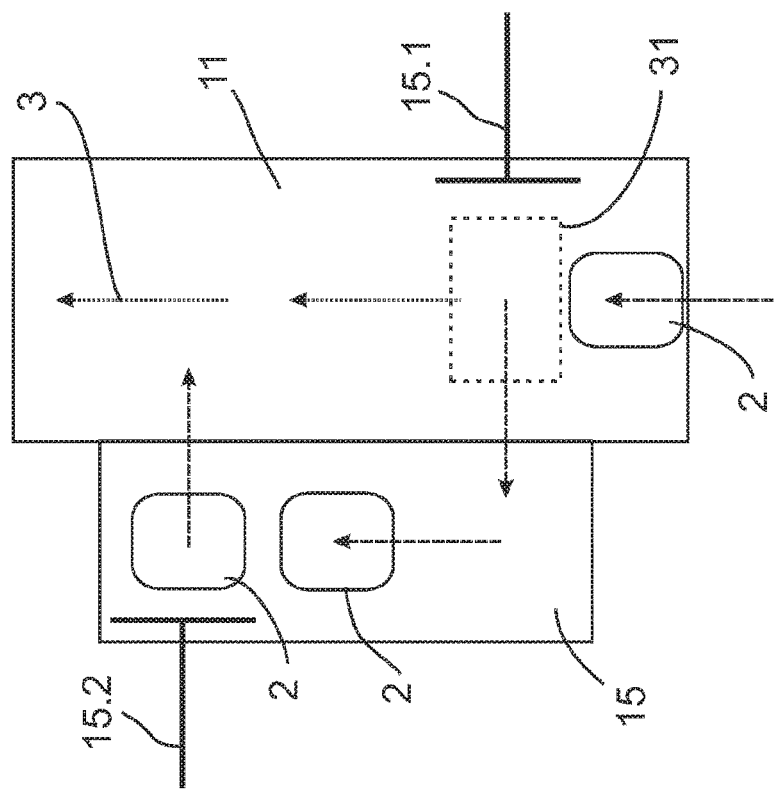
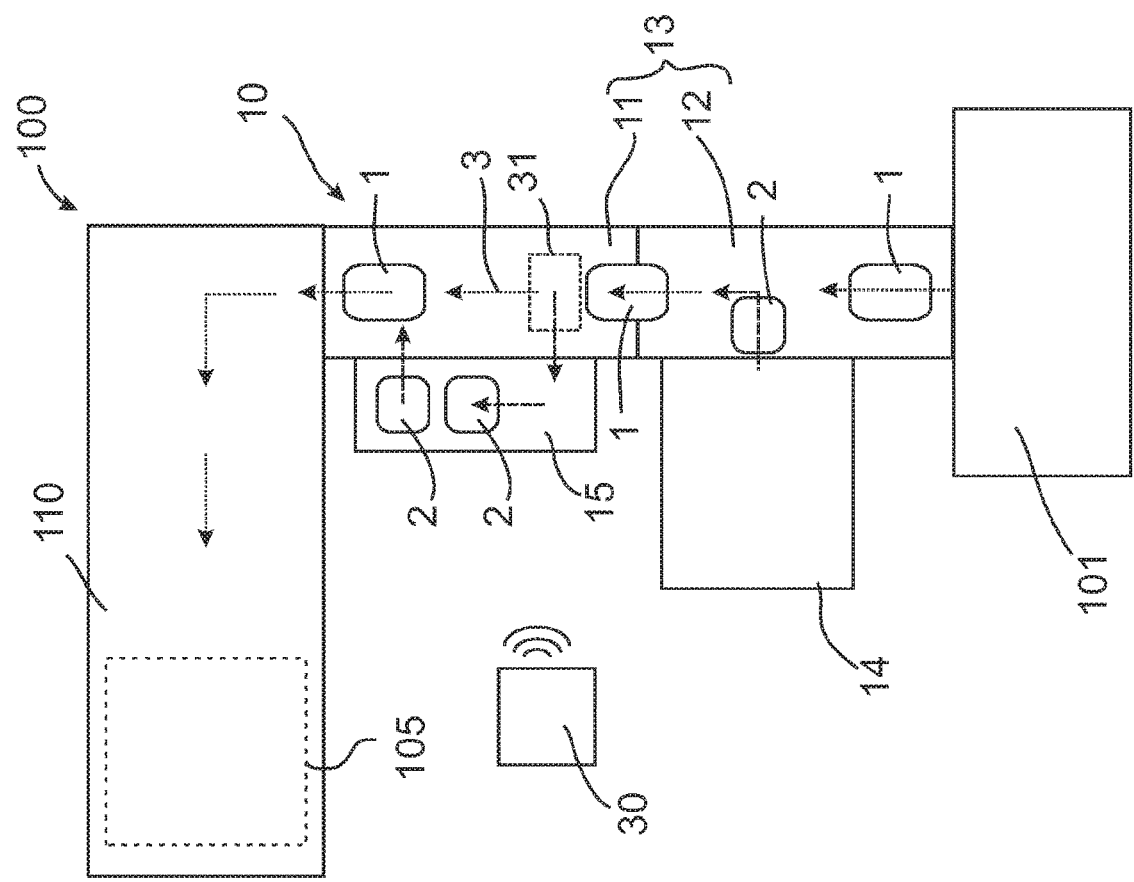

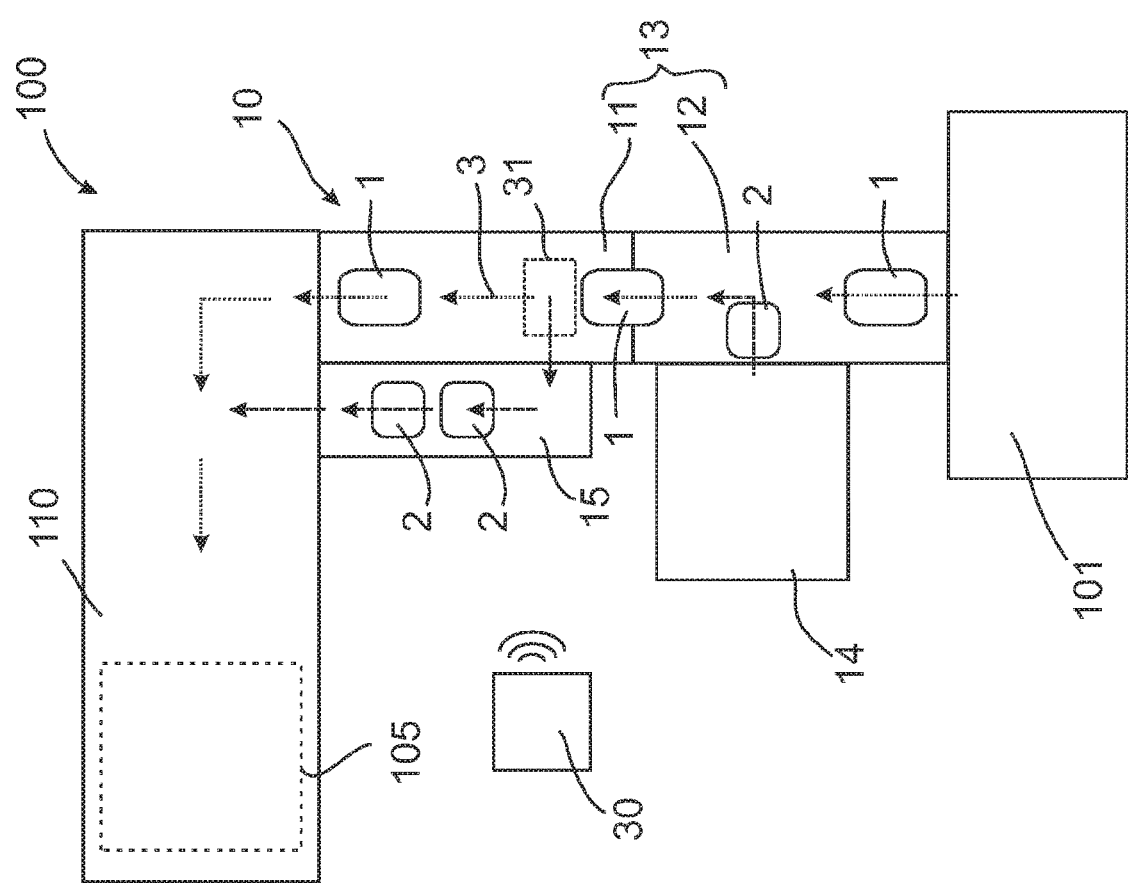

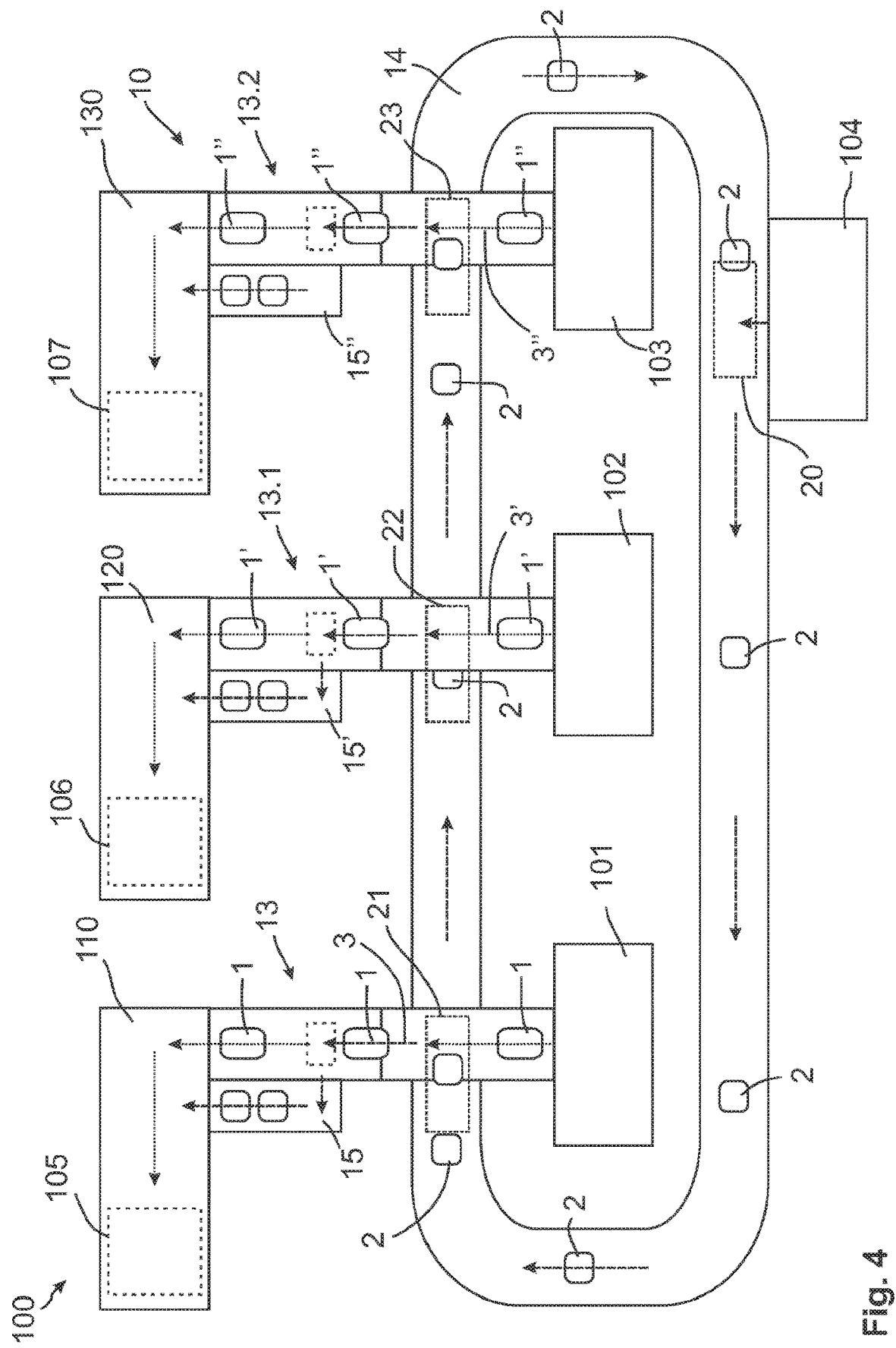

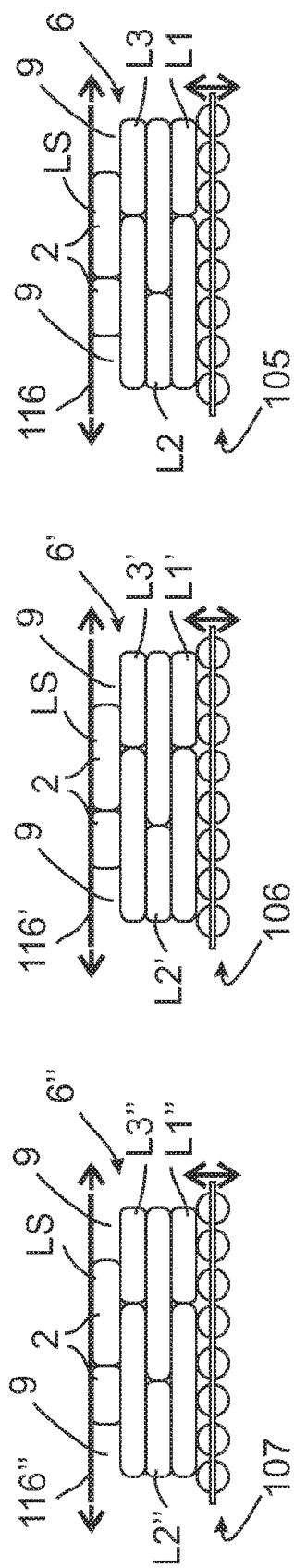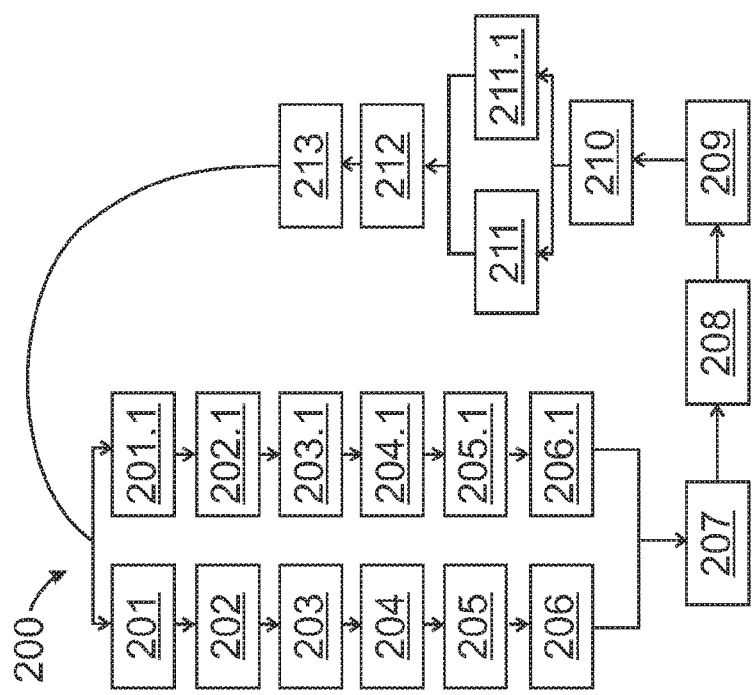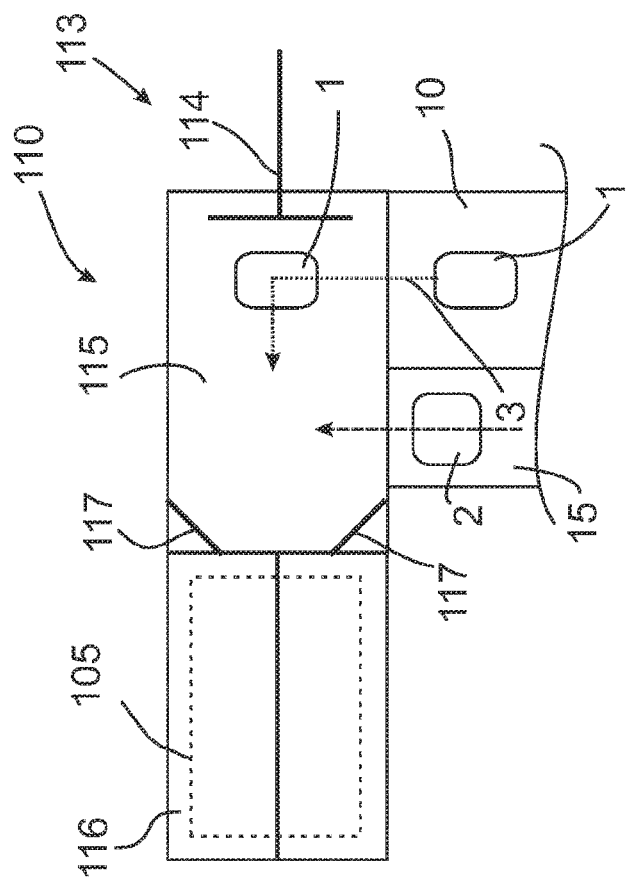

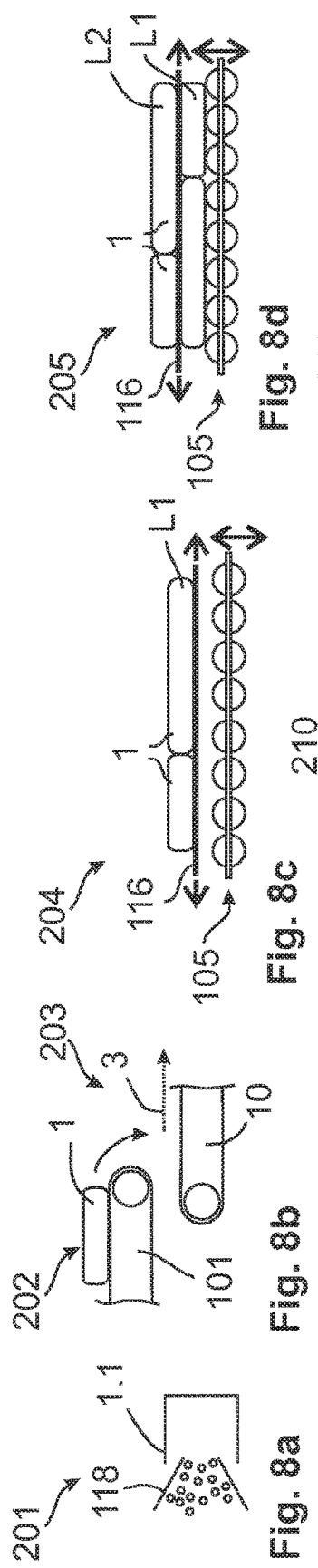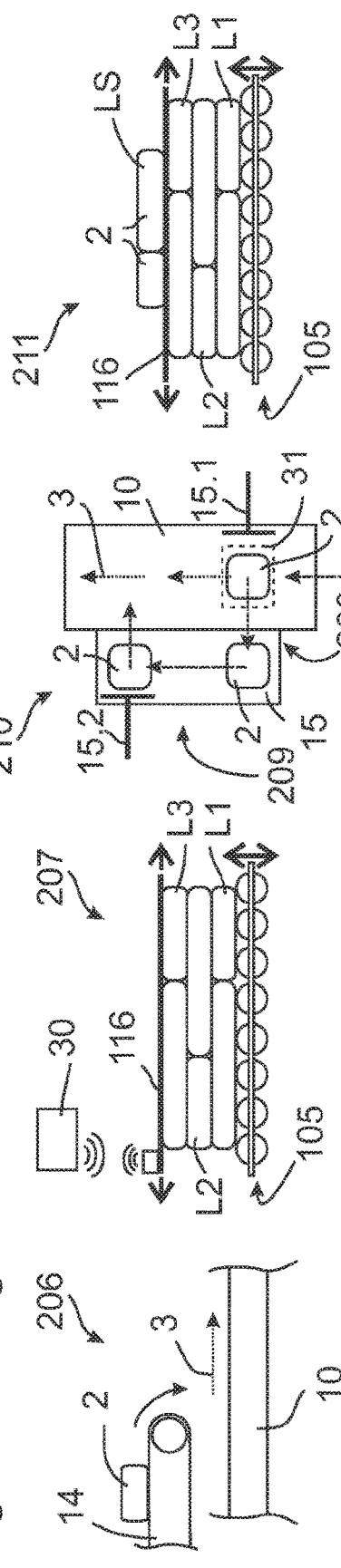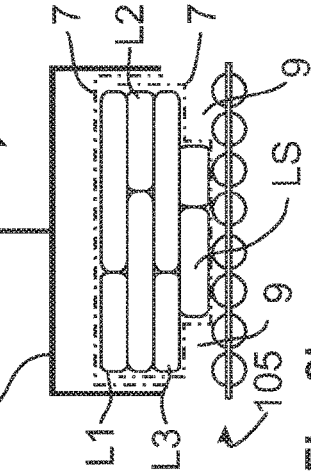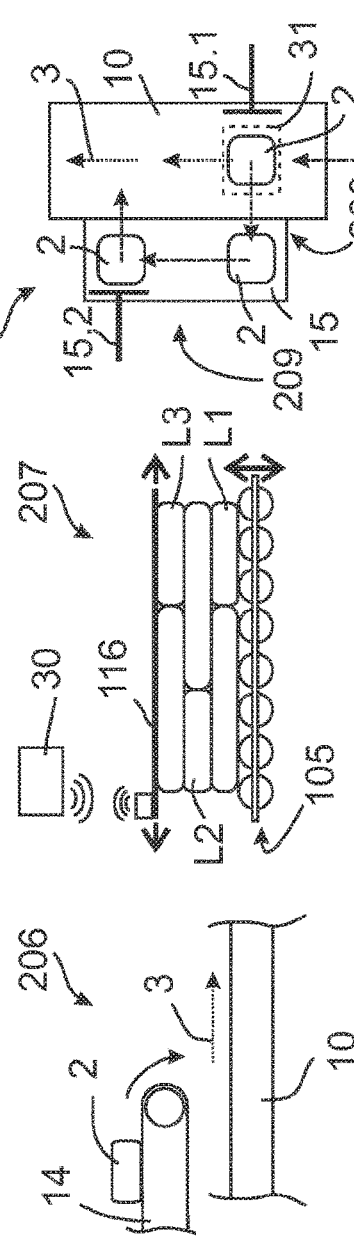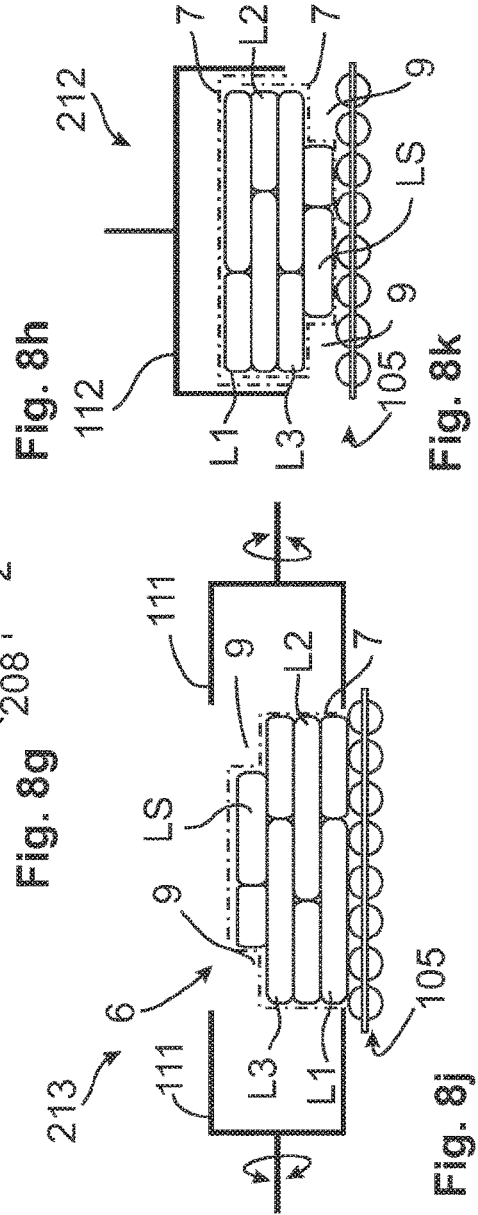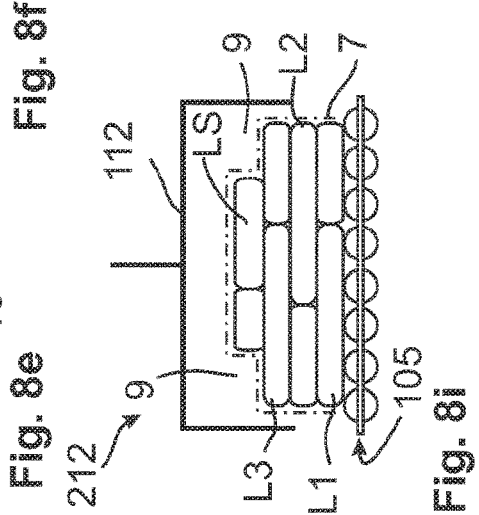

CONVEYING DEVICE, SYSTEM FOR STACKING FILLED BAGS, AND METHOD FOR STACKING FILLED BAGS

The invention relates to a conveying device for conveying filled bags according to the present disclosure, a system for stacking filled bags according to the present disclosure and a method for stacking filled bags according to the present disclosure.

From the state of the art it is known to convey bags by means of conveyor systems from a filling machine to a palletizer, in which the filled bags are at least partially automatically stacked to a stack of bags. Due to the dimensioning of the machines involved and/or due to method sequences, it may be necessary to connect entire production halls by means of conveying routes. Usually the bags are stacked on a pallet to form a stack of bags using several layers and then secured with a film. In order to further increase load securing and at the same time save the pallet if necessary, it is also known to provide for a palletless bag stack which is initially provided with a stretch hood, i.e. with a film which at least partially surrounds the normally cuboid bag stack from 5 sides. For further securing, the stack of bags can then be turned over, i.e. turned upside down, to provide an additional stretch hood, so that the stack of bags is then completely surrounded by film in particular. The problem here is that by saving the pallet, there are also no recesses for lifting the bag stack with a forklift truck or the like in the bag stack. Therefore, in order to lift such stacks of bags, special lifting devices must be provided.

In order to avoid this, it is also known that the last lowest layer is not completely formed, so that corresponding gaps arise in which a forklift can intervene. However, the disadvantage is that this can be realized in an automatic method for forming the layers at least very laboriously and inaccuracies can arise. Furthermore, it is not possible with every format of filled bags to provide the required recesses if the logic of the arrangement of the layer does not permit this. For example, some bag formats may require only very large recesses when forming a layer pattern, so that the stability of the bag stack is reduced, especially with regard to tilting.

It is therefore the object of the present invention to at least partially remedy disadvantages known from the state of the art. In particular, the object of the present invention is to improve the stacking of filled bags with regard to the handling of the resulting stack of bags in a cost-effective and simple manner and/or to increase the degree of automation of the stacking of filled bags.

The above object is solved by a conveying device with the features of the present disclosure, a system with the features of the present disclosure and a method with the features of the present disclosure claim 20.

Further features and details of the invention result from the dependent claims, the description and the drawings. The feature and details which have been described in connection with the conveying device according to the invention naturally also apply in connection with the system according to the invention and/or the method according to the invention and vice versa in each case, so that with regard to the disclosure of the individual aspects of the invention, reference is or can always be made to each other.

According to the invention, the conveying device for conveying filled bags comprises a conveying unit by means of which at least part of a conveying path for conveying filled normal bags from a feeding station to a stacking area can be formed. A supply unit is also provided from which filled special bags can be fed into the conveying path, so that a stack of filled normal bags and filled special bags can be produced in the stacking area.

Filled normal bags can be understood as bags of a certain format, which are mainly or in the majority provided in the bag stack. For example, the size of normal bags can correspond to an internal standard and/or a standard size of filled bags. In particular, in the following filled normal bags are also partly referred to as normal bags and filled special bags are also partly referred to as special bags, so that in the case of unfilled bags this is indicated separately. Preferably several layers of normal bags can be formed in the stacking area and at least one layer of special bags. Special bags can be defined as bags of a format that has been modified in comparison with normal bags, so that stack patterns that can be formed from normal bags are extended by additional stack patterns that can be formed by the special bags. Preferably the special bags can have a volume which is configured in such a way that the weight of one layer of filled special bags corresponds to the weight of one layer of filled normal bags.

By providing a bag stack which, in addition to filled normal bags, also has filled special bags, i.e. bags of a format differing from the format of the normal bags, alternative stack patterns of a layer of filled special bags can be formed by providing a bag stack without pallets in a simple manner so that recesses can be provided which are suitable for receiving the bag stack by means of a fork lift truck, in particular by means of a standardized fork lift truck. This means that it is not necessary to provide a special hoist for conveying the bag stack, as the bag stack thus partially integrates the functions of a pallet itself. For example, the corresponding recesses can be regarded as interfaces which enable the bag stack to be lifted or conveyed, and the bag stack can also be completely covered, for example with a stretch hood, so that external load securing and thus increased stability can also be introduced into the bag stack.

The fact that the conveying device also has the supply unit enables the filled special sacks to be inserted, in particular, directly into the conveying path. The conveying path can be understood as a distance that the normal bags cover from the feeding station to the stacking area before they are stacked. The feeding station can be understood as a bag filling system, for example, which feeds a product into the bags and closes the bags in particular. In addition, the loading station can include a storage area for pre-fabricated, filled normal bags, so that these are only loaded from the storage area to the conveying device for additional transport, i.e. to the conveying path. The stacking area can be an area with a surface intended to form the stack of bags on top of it. Preferably the stacking area can be part of a stacking unit for automatic stacking of the bags. Part of the conveying path can also run in the stacking unit. This means that the supply unit is preferably arranged directly on the conveyor unit of the conveying device and/or a stacking unit. In particular, the stacking area may extend at least partially or completely within the stacking unit. The supply unit can be understood as a device for the automatic insertion of the filled special bags into the conveying path. For example, the special bags can be filled directly at the supply unit and then fed into the conveying path. In addition or alternatively, the supply unit can have a store for filled special bags from which the filled special bags can be automatically or manually fed into the conveying path and/or conveying device.

As the supply unit enables the filled special bags to be inserted into the conveying path, they can be inserted into an automated stacking method. For example, the special bags can be inserted at regular intervals or on request, in particular by a control unit. It may then be possible to stack the filled special bags similar to the filled normal bags using a stacking unit in the stacking area. This enables a high level of layer accuracy compared to manual stacking and cost savings. By integrating the filled special bags into the normal stacking method, in particular, it can be ensured that the machines involved continue to run during stacking and do not have to be stopped or only slightly stopped. Preferably, the conveying device can be configured to convey the filled bags from a first production hall to a second production hall. This enables greater independence of the dimensioning of the stacking unit and/or the feeding station from a given size of the production halls to be achieved. Furthermore, the supply unit may also be located in the first production hall, so that the material supply for the production of the bags can be concentrated at least essentially in one area, so that storage costs can be reduced and productivity increased.

In the context of the invention, it is also conceivable that the filled special bags can be stored in an intermediate storage unit, the intermediate storage unit being arranged on the conveyor unit in such a way that the filled special bags can be fed to the intermediate storage unit from the conveying path. Preferably, the intermediate storage unit of the supply unit can be arranged downstream of the filled normal bags in one conveying direction, i.e. provided behind the supply unit in the method. This enables, for example, the special bags to be feed into the conveying path at regular or irregular intervals, irrespective of the requirements of the special bags in the stacking area, without the special bags being processed directly in the stacking area. This allows them to be removed from the conveying path after a certain distance and stored temporarily in the intermediate storage unit. Preferably, several filled special bags can be stored in the intermediate storage unit. The intermediate storage unit can be configured to hold at least a number of filled special bags, which is required to form a layer of filled special bags. In particular, the intermediate storage unit can also be configured as a moving storage unit on which the filled special bags can be driven continuously or discontinuously. Preferably, this propulsion can be made slower than the propulsion of the conveying unit. In particular, the intermediate storage unit and the conveyor unit can therefore both have a conveyor. This allows the intermediate storage of the filled special bags in a simple manner, in particular at the same time as the transport of the special bags along a route.

Furthermore, it is conceivable that the intermediate storage unit for the storage of the filled special bags is configured on one level in the case of a conveying device according to the invention. For example, the intermediate storage unit can have a conveyor belt and/or a roller conveyor. Storage on one level can therefore be understood to mean that the special bags are stored one behind the other, for example, and not at height. The level storage makes it easy to feed the filled special bags to the intermediate storage unit and from the intermediate storage unit back to the conveying path. Therefore, it is not necessary to provide appropriate stacks or even stacking patterns. Separation of the filled special bags is also not necessary or can be very simple. For example, a slider may be provided which operates on the level in which the filled special bags can be stored in the intermediate storage unit in order to transport the filled special bags from the intermediate storage unit to the conveying path or from the conveying path to the intermediate storage unit. Due to the storage on one level, separation is no longer necessary. Preferably, a first slider may be provided at a first end of the intermediate storage unit and a second slider at a second end of the intermediate storage unit to process the filled special bags. This allows transport and stacking to be performed in a cost-effective manner and, in particular, automated.

Advantageously, in a conveying device according to the invention, the filled special bags can be transferred directly from the intermediate storage unit to the stacking unit or to the conveyor unit in the conveying path. Thus, the intermediate storage unit can be arranged directly at the stacking unit and/or directly at the conveyor unit in order to enable a reliable transfer of the special bags. The transfer of the special bags can be understood as a forwarding, which can be performed automatically or manually. For example, a robot arm can be provided through which the special bags can be gripped or a slide through which the special bags can be slid. Preferably, the intermediate storage unit may be raised at least on one side in the area of transfer from the intermediate storage unit to the stacking unit or conveyor unit so that the bags can fall from the intermediate storage unit to the downstream station. A direct transfer to the stacking unit has the advantage that this can be provided just before the stacking area, so that additional transport of the special bags is shortened and thus the risk of damage to the special bags can be reduced. A direct transfer to the conveyor unit, on the other hand, offers the advantage that the special bags can be inserted into the stacking unit like normal bags and it is therefore possible that the stacking unit has no additional transfer area with the intermediate storage unit. In addition, the formation of stacking layers can also be simplified as a result. Nevertheless, the risk of not detecting a break in the special bags or only detecting it in the stacking area can be reduced overall by the intermediate storage unit. For example, the intermediate storage unit can have an optical detection device to detect defective special bags so that, for example, the defective special bags can be taken into account, in particular sorted out, in a demand message.

It is also conceivable in the context of the present invention that a control unit is provided through which a need for filled special bags in the stacking area can be identified. The requirement can be understood to mean, for example, that sufficient layers of filled normal bags are formed in the stacking area and that a layer of special bags is then to be formed. Thus, the control unit can preferably communicate with or control the supply unit and/or the intermediate storage unit. If the control unit then detects a need for filled special bags, the control unit can, for example, send a signal to the intermediate storage unit or control the intermediate storage unit so that sufficiently filled special bags are fed from the intermediate storage unit into the conveying path to form a layer of filled special bags. Thus, an additional degree of automation can be achieved by the control unit. In particular, the manual monitoring effort of the conveying device by the control unit is also reduced, as it can control parts of the method automatically.

In the context of the invention, it is also conceivable that the control unit is configured in such a way that the demand for filled special bags can be triggered if a predefined target parameter is reached in the stacking area. Under the predefined target parameter, for example, a weight of the bags already stacked, a number of bags already stacked or the like can be provided. The target parameter can particularly preferably include an already stacked number of layers of normal bags in the stacking area. This may reduce a dependency on the number of bags, in particular because during transport of the bags to the stacking area of individual bags, bursting may occur, which may result in a number of bags actually stacked not matching the number of bags transported. Preferably the control unit can have a microprocessor, a computer, a server or the like to realize the described functions.

The invention may also provide for a sensor unit to be arranged on the conveyor unit and/or on the intermediate storage unit so that the filled special bags can be identified. This enables the filled special bags already inserted into the conveying path to be distinguished from filled normal bags, so that when a filled special bag is detected by the sensor unit, a slide can be activated which slides the detected filled special bag onto the intermediate storage unit. Thus, a sorting of chaotically combined filled special bags and filled normal bags can be performed. The sensor unit can be mechanically and/or optically configured for this purpose. For example, the sensor unit can include a mechanical switch, which is only triggered for a certain size of bag format. Preferably the sensor unit can be optically configured and, for example, have a light barrier and/or a camera through which the special bags and/or the normal bags can be identified and/or detectable. For this purpose, the sensor unit can be arranged in the conveyor unit and/or on the intermediate storage unit in order to detect the special bags in the conveying path. Preference may also be given to a detection unit to monitor the introduction of the filled special bags from the intermediate storage unit into the conveying path. The detection unit may preferably include a camera for this purpose.

In the context of the invention, it is also conceivable that the supply unit, the conveying unit and/or the intermediate storage unit comprises a conveyor belt and/or a roller conveyor. A conveyor belt or a roller conveyor are simple ways of conveying the filled special bags or normal bags, while at the same time providing a high degree of accessibility, for example to detect faults, especially manually, and/or to process the bags at a downstream station. For example, the supply unit may include a conveyor belt and/or a roller conveyor even if the supply unit is configured to fill the special bags. In particular, the special bags can first be filled and then inserted on a conveyor belt and/or roller conveyor to be transported to the conveyor device.

Furthermore, in the case of a conveying device according to the invention, it may be provided that the supply unit has a circulating conveyor. The supply unit may preferably comprise a feed area for receiving the filled special bags, in particular by the supply unit, and at least a first delivery area for transferring the filled special bags into the conveying path. A circulating conveying means can be understood as a conveying means that runs in a ring, oval or circular fashion, for example. For example, the conveying means can have an endless belt which can transport the special bags in a circle until they are needed at the delivery area. This enables several stacking areas to be supplied with special bags independently of the filled normal bags. On the other hand, it is possible to store several special bags in the supply unit due to the circulating conveying means. In addition, special bags which are not required at the delivery area can be provided at an additional delivery area or first removed from the first delivery area and only removed there if required. The delivery area can be understood in particular as a delivery area where, for example, a device can be arranged through which the special bags can be fed from the supply unit into the conveying path. At the loading area, it may also be planned to load the special bags into the supply unit or to load them for additional transport. For example, a special task station can be provided at the feeding area, which fills the special bags and then transfers them to the supply unit.

Preferably, in the case of a conveying device according to the invention, it may also be provided that the supply unit has at least one second delivery area. For example, the supply unit can serve an additional conveyor means with special bags. Thus, it may be sufficient to provide a supply unit for several stacking areas where special bags are required. This allows the productivity of the entire unit to be further increased. Furthermore, it is not necessary to provide more than one feeding area at the supply unit, as the special bags can be transported further all round. It may preferably be provided at the first delivery area that filled special bags of a first format can be introduced into the conveying path and filled special bags of a second format and/or of the first format can be introduced into an additional conveying path at the second delivery area. For example, a sensor unit can be provided at each of the first and second delivery areas, through which the special bags can be identified and assigned to the first delivery area according to their format, or they can be conveyed to the second delivery area on the supply unit, so that the filled special bags can be identified again at the second delivery area and processed there. Thus, one and the same supply unit may provide for several delivery areas to be supplied with different special bags without the need to provide a single supply unit for each delivery area. It is conceivable that filled special bags of different formats can be stored in the supply unit.

In the context of the invention, it is also conceivable that the conveying device has an additional conveying unit to which at least one additional stacking unit can be arranged in order to produce an additional stack of bags. Several additional stacking units can preferably be arranged or planned, which can be configured to create a secondary stack, a tertiary stack and additional stacks. The additional bag stack can also be formed from normal bags and special bags or from secondary bags and special bags. Thus, for example, an additional production line for stacking filled bags can be operated by the one connected to the conveying device. Preferably, the supply unit can be a circulating supply unit in order to supply all bag stacks with special bags. In particular, secondary and tertiary bags may be bags which have a different format from normal bags. This enables, in particular, different product lines to be produced in parallel with the same conveying device.

According to another aspect of the invention, a system for stacking filled bags is required. The system has a feeding station, through which filled normal bags can be fed into a conveying path to transport the filled normal bags from the feeding station to a stacking area. Furthermore, the system has a conveying device, in particular a conveying device in accordance with the invention, which is arranged at the feed station so that at least part of the conveying path is formed by a conveying unit of the conveying device. The system also has a stacking unit arranged on the conveying device, which can be used to create a stack of bags. In addition, the conveying device also has a supply unit from which filled special bags can be fed into the conveyor path, so that the stack of bags can be produced from filled normal bags and filled special bags in the stacking area.

Thus, a system according to the invention has the same advantages as described in detail with regard to a conveying device according to the invention. The stacking unit can also be used to automatically stack the filled bags in the stacking area. In particular, the stacking unit may be configured as a palletizer configured for palletless stacking and/or for stacking on a pallet. Preferably the conveying path is formed by the conveying unit and the stacking unit. For example, the filled bags may be slid from the conveyor unit onto the stacking unit or dropped onto the stacking unit. In order to be conveyed to the stacking area, an additional part of the conveying path may be necessary.

It is also conceivable in the context of this invention that the feeding station has a filling device through which previously unfilled normal bags can be filled. Thus, the feeding station can be configured for processing unfilled normal bags. Preferably, the feeding station can be configured to process film into bags, fill the bags and then seal them. This means that the feeding station can be at least partially or completely automated as a processing unit, so that the entire method, from filling the normal bags to stacking to form a stack of bags, can be further automated. This saves costs and ensures the reproducibility of a method. For example, the filling device may preferably have a sealing unit to process film into bags and/or to seal filled bags.

It is also conceivable that at least one additional feeding station, through which secondary bags can be filled, and/or at least one additional stacking unit for producing an additional stack of bags is arranged on the conveying device. Preferably the additional feeding station and/or the additional stacking unit can be arranged at the additional conveying unit. Thus, several different feeding stations, which produce filled bags in parallel, and/or stacking units, which stack filled bags in parallel, can be provided, so that the productivity of the system can be increased. At the same time, the same conveying device can be used for this purpose, which can result in further cost savings.

It is also conceivable within the scope of the invention that the conveying device and/or the stacking unit has a control unit which indicates a need for filled special bags in the stacking area. In particular, a central control unit can be provided for the entire system, in which, for example, several control units of the conveying device and the stacking unit can be combined, at least with regard to data exchange. Preferably, the control unit can be configured in such a way that the demand for filled special bags can be triggered when a predefined target parameter is reached in the stacking area.

In the context of the invention, it is also conceivable that a special feeding station for filling previously unfilled special bags and/or for introducing the filled special bags into the feeding unit is arranged on the feeding unit of the conveying device. The provision of the special feeding station means that it may not be necessary to convert the feeding station to special bags for filling the normal bags and/or to pre-produce filled special bags and store them in the supply unit in appropriate quantities. The supply unit can fill the special bags directly and insert them in the conveying path when required or at the appropriate rate. The creation of filled special bags can also be automated, so that manual activities can be reduced and further costs can be saved. Furthermore, the reproducibility of the method for stacking the bags can be further increased.

The invention may further provide that the stacking unit has a turning means by which the stack of bags is rotatable such that a previously top layer of the stack of bags, after rotation by the turning means, forms a bottom layer of the stack of bags. Thus, the stack of bags can be turned upside down by the turning means and wrapped with a film from the top and bottom side. In addition, the position of the filled special bags can be inserted into the bag stack last, depending on the number of layers of filled normal bags, so that the position of the special bags then forms the bottom layer of the bag stack and thus, creates recesses for lifting the bag stack on the bottom.

In the case of a system in accordance with the invention, the stacking unit may also advantageously have a wrapping device by means of which the stack of bags can be wrapped at least partially with a film. Preferably the film can be a stretch hood. This means that an additional load securing device can be inserted into the bag stack so that it remains stable during turning and additional transport. In addition, a stretch hood can be used, for example, to protect the filled bags of the bag stack against environmental influences.

Furthermore, in a system according to the invention, it is conceivable that the stacking unit comprises a sliding device by which a part of the conveying path is formed, wherein the sliding device comprises a slider by which the filled bags can be conveyed from a sliding surface onto a sliding table. In order to ensure precise layer formation, it is advantageous to provide such a sliding device. This enables to easily transport the filled bags from the conveying device to the sliding surface, from where the filled bags are transported in the direction of the sliding table, which is preferably located in the stacking area. The sliding table preferably has two table elements which can be folded up or slid apart so that filled bags lying on the sliding table fall down and thus form a layer of the bag stack. A lifting device can be arranged below the sliding table, which is configured to lower the layers already stacked so that sufficient space is available for additional layers below the sliding table and at the same time a drop height for subsequent layers does not become too large. The sliding device can also preferably have guide means which guide the bags according to the desired layer pattern when the bags are slid. Preferably, the conveying path at the sliding device has a 90° angle, so that installation space can be saved in relation to the length of the overall system and the stacking location is easily accessible. The sliding device is another functional element that can lead to or contribute to a high degree of automation of the system.

According to another aspect of the invention, a method for stacking filled bags into a stack is also required. The method comprises the following steps:

placing filled normal bags in a conveyor path to transport the filled normal bags from a feeding station to a stacking area, conveying the filled normal bags along a part of the conveyor path to the stacking area by means of a conveying device, forming a first layer of at least two rows of filled normal bags in the stacking area, forming at least one second layer of at least two rows of filled normal bags on the first layer, at least one special bag must be inserted in the conveying path, formation of a special layer from at least one special bag in the stacking area Preferably, the conveying device can be a conveying device according to the invention. Thus, a method according to the invention has the same advantages as described in detail with regard to a conveying device according to the invention. This makes it easy to create a stack of filled normal bags and filled special bags in the stacking area. The formation of the first and/or second layer may include the covering of an additional part of the conveying path. For example, it may be provided that the bags are slid from the entrance of a stacking unit to the stacking location or otherwise transported. Additional layers of normal bags can preferably be formed on the second layer. Preferably, the method may also include at least one of the following steps:

filling of normal bags and/or filling of special bags.

Preferably, the filling of normal bags and/or the filling of special bags can be performed automatically. This allows a high degree of automation of the method. The method can also provide a complete processing line, in particular, from filling the bags to forming the bag stack. As already described, the special bags enable stack patterns that can be formed from normal bags to be expanded by adding additional variants of stack patterns and to improve the manageability of the finished bag stack by creating a layer of the special bags.

The invention may also provide for the method to include the following step:
turning of the formed layers of the bag stack so that a previously top layer forms a bottom layer of the bag stack after turning.

This allows the bag stack to be handled from both sides. This means that additional load securing devices can be provided to support the bag stack both in relation to the lowest layer and the top layer. Turning of the formed layers can preferably be performed by a turning means of a stacking unit. The turning of the formed layers is therefore preferably performed automatically. Thus, a force can preferably be applied to the top and bottom layers, so that the bag stack is given a stability by compression which is sufficient to tilt the bag stack briefly into the horizontal position and then turn it upside down. This allows, for example, the position of a special bag layer to be changed in relation to the contact area of the bag stack.

Advantageously, the special layer can be configured as a last layer of the bag stack in a method according to the invention. Therefore, the special layer can form the top layer, which becomes the bottom layer of the bag stack after turning. This enables the lowest layers for stacking from normal bags first to be provided, so that maximum stability of the bag stack is maintained during stacking. If the special layer is then applied as the last layer, which forms less contact area for the bag stack, the bag stack initially continues to stand on the layers of the normal bags. The bag stack can then be given initial load securing, which connects the special layer and the normal layers. If the bag stack is then turned over, the special layer will again stand up as the bottom layer on the stacking area, in particular on the floor, but the stack of bags has already been additionally secured and in the finished stacked state is also not exposed to dynamic loads from the application of additional layers, so that instability with regard to tilting of the stack of bags is correspondingly reduced. This can preferably be followed by additional load securing in order to further increase the manageability of the bag stack. In particular, the special bags can be configured in such a way that a weight of the special layer corresponds to a weight of the first layer. This simplifies the handling of the bag stack, as the quantity of product contained in the filled bags can be estimated more easily. In particular, the special layer can include five special bags to ensure high tipping stability of the bag stack.

Preferably, in the case of a method according to the invention, it may also be provided that the method includes the following step:
wrapping the stack of bags with a film.

Preferably, the bag stack can be wrapped at least partially or completely with a stretch hood. The film is a particularly cost-effective way of securing the load on the bag stack. In addition, the film's flexibility offers various other advantages in the manageability of the bag stack and in the further processing of the products it contains. The film can be transparent so that it is easy to check the products delivered in the bag stack. Furthermore, films, especially stretch hoods, offer the advantage that motifs, especially company logos, can also be printed to give the bag stack a higher quality appearance. Stretch hoods also offer the advantage that they are at least essentially waterproof and can therefore protect the bag stack from further environmental influences. Applied pre-tensioning forces further increase load securing.

Preferably, the following steps may also be required in the case of a method according to the invention:
transport of filled secondary bags along an additional conveying path to an additional stacking area,
forming a first layer of at least two rows of filled secondary bags in the additional stacking area,
forming at least one second layer of at least two rows of filled secondary bags on the first layer of filled secondary bags,
at least one special bag is inserted into the additional conveying path,
forming a special layer from at least one special bag in the wider stacking area.

This means that an additional stacking area can be served by filled bags, whereby special bags can also be introduced here, in particular so that a mixed stack can be produced. The secondary bags may preferably be of the same or different size to the normal bags. Preference may also be given to at least one of the following steps:
filling of secondary bags and/or
placing filled secondary bags in the conveying path to transport the filled secondary bags from another feeding station to the next stacking area.

In particular, the filling of secondary bags can also be performed automatically. This can further increase the degree of automation. Thus, a second production line of bags of the same or different format can be provided, so that the productivity of the entire line can be increased. Preferably, the filling and/or transport of the secondary bags as well as the formation of the secondary layers can be performed parallel to the filling and/or transport of the normal bags as well as the formation of the layers of the normal bags in the stacking area. In most cases, the demand for special bags per bag stack is lower than the demand for normal bags. Therefore, it may make sense to serve an additional stacking area with the filled special bags in order to be able to provide the filled special bags continuously, in particular with a production speed corresponding to a production speed of the filled normal bags, and thus increase the overall productivity at the same time.

Preferably, the bag stack in a method in accordance with the invention can be configured as a cuboid-like and the special layer can be formed by arranging the filled special bags in such a way that at least on two sides, preferably on four sides of the stack of bags, there is a lifting recess. Preferably the two sides are opposite sides. Thus, the special layer can preferably be applied in rectangular or square form, in particular in the middle of the previous layer, so that the lifting recesses are produced on the outside. This ensures that even a standardized forklift truck can engage the lifting recesses on both sides of the bag stack to lift or transport the bag stack further. If a lifting recess is provided on each four sides of the bag stack, this also offers the advantage that the handling of the bag stack can be further improved, since a lifting device, such as a forklift truck, can approach the bag stack regardless of its orientation and transport it accordingly.

It may also be preferable in the case of a method according to the invention that the method includes the following steps:
remove the special bag from the conveying path, intermediate storage of the special bag, the special bag is inserted in the conveying path again.

In addition or alternatively, it can be provided that the special bag is removed according to an additional conveying path, is cached there and is then reintroduced into the additional conveying path. This allows special bags to be pre-produced and fed into the conveying path independently of a need in the stacking area. If there is no need for special bags, they are simply removed from the conveying path, cached and only reintroduced when required. This ensures that a high degree of authorization is maintained for the transport of the special bags, whereby the control effort can be kept to a minimum. Preferably, the special bag can be removed and reinserted on the basis of signals from a control unit and/or a sensor unit. Thus, the demand can be identified by a control unit and the special bag in the conveying path can be identified optically by a sensor device.

In the context of the invention, it is also conceivable that the method includes the following step:

identification of a need for at least one special bag.

Preferably, the special bag can only be inserted and/or re-inserted once the need has been identified. The identification of the need for at least one special bag can preferably be performed automatically by a control unit and/or a sensor unit. This means that manual activities for stacking the filled bags can continue to be reduced, thus increasing the degree of automation. This results in a high reproducibility of the stacking result at low costs.

The procedural steps of a method according to the invention can be performed successively or at least partially in parallel. Preferably, individual or all method steps can be repeated. Furthermore, the method steps can be performed in any order.

Further measures to improve the invention result from the following description of some examples of the embodiments, which are shown schematically in the figures. All features and/or advantages resulting from the claims, the description or the drawings, including constructive details, spatial arrangements and method steps, can be essential for the invention both in themselves and in the most diverse combinations. It should be noted that the figures are only descriptive and are not intended to restrict the invention in any way. Show it:

FIG. 1 a system according to the invention with a conveying device according to the invention in a first embodiment;

FIG. 2 a sliding device of the stacking unit of the first embodiment,

FIG. 3 a system according to the invention with a conveying device according to the invention in a second embodiment, FIG. 4 a system according to the invention with a conveying device according to the invention in a third embodiment in schematic plan view, FIG. 5 Stack areas of the third embodiment in schematic representation, FIG. 6 a sliding device of the third embodiment in schematic plan view, FIG. 7 a schematic representation of method steps of a method according to the invention for stacking filled bags in a fourth embodiment FIG. 8*a* to *k* further schematic representations of method steps of the method according to the invention method for stacking filled bags of the fourth embodiment.

In the following figures, identical reference signs are used for the same technical features, even for different embodiments.

FIG. 1 shows a system 100 according to the invention for stacking filled bags 1, 2 to a bag stack 6 with different bag formats in a first embodiment in schematic plan view. A feeding station 101 is provided, through which filled normal bags 1 can be fed into a conveying path 3 for conveying the filled normal bags from the receiving station 101 to a stacking area 105. In particular, the feeding station 101 is configured to fill normal bags 1 and/or to manufacture them from a material, in particular a plastic film. Conveying path 3 is also partly formed by a conveying device 10 and partly by a stacking unit 110 arranged on the conveying device 10. The stacking unit 110 can be used to create the bag stack 6 in the stacking area 105. The stacking unit 110 is preferably a palletizer. In the stacking area 105, the stacking unit 110 can also be used to produce a bag stack 6 from filled normal bags 1 and filled special bags 2. In addition, a supply unit 14 of the conveying device 10 is provided, from which filled special bags 2 can be brought into the conveyor path 3. This allows the filled special bags 2 to be fed into conveyor path 3 even before the layers for bag stack 6 have been produced and thus to be treated automatically, similar to normal bags 1. In particular to connect several production halls, the conveying device 10 has a conveyor unit 13, which preferably comprises two or more conveying means 11, 12. Thus, the supply unit 14 can be arranged on the conveying device 10 in such a way that it conveys the special bags 2 onto a second conveyor means 12, which further transports the special bags 2 along a part of the conveying path 3 and passes them on to a first conveyor means 11. In order to be able to insert the special bags 2 into the conveying path 3 independently of a requirement in the stacking area 105, an intermediate storage unit 15 is preferably provided, through which the special bags 2 can be stored. In addition, a sensor unit 31 is arranged on the conveyor unit 13 or on the intermediate storage unit 15, through which a filled special bag can be identified in the conveying path 3 and can be removed according to the conveying path 3 in order to feed it to the intermediate storage unit 15. In addition, a control unit 30 is provided, which is configured to detect a need for special bags 2 in the stacking area 105. For example, the control unit 30 can communicate in particular wirelessly with the stacking unit 110, so that, for example, 105 layers of filled bags 1, 2 can be counted in the stacking area. If a target size, e.g. the number of layers formed, is reached in the stacking area 105, the control unit 30 can thus determine a need for special bags, so that these can be provided in particular as the top layer on a bag stack 6 in the stacking area 105. In particular, the conveying device 10 or the stacking unit 110 may include the control unit 30. Special bags 2 can be removed from intermediate storage 15 and fed to conveying path 3 so that they can be processed by stacking unit 110 similar to a layer of normal bags.

It is preferable to remove the special bags from conveying path 3 to intermediate storage unit 15 and from intermediate storage unit back to conveying path 3 as shown in FIG. 2. A first transfer means 15.1 is provided through which the filled special bags 2 can be transported from conveying path 3 to the intermediate storage unit 15. In addition, a second transfer means 15.2 is provided by which the special bags can be returned from the intermediate storage unit to conveying path 3, i.e. in particular to conveyor means 11 of conveyor unit 13. Preferably, the first and/or second transfer means 15.1 may be used as a slide or ejector means. For this purpose, the intermediate storage unit 15 and the conveyor 11 can be arranged directly next to each other in order to allow an easy transfer of the special bags 2. In the embodiment shown, the special bags are transferred from the intermediate storage unit 15 to the conveyor 11 of the conveyor unit 13 when they are returned to conveying path 3. Thus, the intermediate storage unit 15 can be arranged along the conveying path 3 near the conveyor unit 13 and thus be independent of the stacking unit 110.

FIG. 3 also shows a system 100 according to the invention with a conveying device 10 according to the invention in a second embodiment in schematic plan view. The second embodiment corresponds essentially to the first embodiment, but has differences with regard to the intermediate storage unit 15. Thus, an intermediate storage unit 15 of the second embodiment is arranged on a first conveying means 11 of a conveying unit 13 of the conveying device 10 and on a stacking unit 110 in such a way that special bags 2 can be removed from the conveying path 3 and stored in the intermediate storage unit 15. In the embodiment shown, however, these are not returned to the conveyor unit 11, but forwarded directly to the stacking unit 110 if required. This allows the conveyor unit 11 to operate at least essentially independently of the intermediate storage unit 15. Thus, for example, it is not necessary to stop a supply of normal bags by a second conveyor 12 to the first conveyor 11, so that special bags 2 can be transferred successively to the conveyor 11, or to adjust the introduction of the special bags 2 into the conveying path 3 accordingly in such a way that no normal bags 1 are unintentionally introduced into a special layer to be formed. Instead, by configuring the second embodiment, the conveying means 11, 12 of the conveying unit 13 can stop completely if a special layer is required, for example, or a slower transport of the normal bags can be achieved at least in certain areas, so that the special bags can preferably be inserted one after the other into the stacking unit 110 to form a special layer. Preferably, the intermediate storage unit of the first and/or the second embodiment can be configured to store the special bags 2 in one level, whereby the intermediate storage unit can have, for example, a conveyor belt or a roller conveyor and the feed can thus be realized in a simple manner.

FIG. 4 shows a system 100 according to the invention with a conveying device 10 according to the invention in a third embodiment. The conveying device 10 has a conveyor unit 13, through which a conveying path 3 from a feeding station 101 to a stacking area 105 is formed at least partially. In the stacking area 105, the stacking unit 110 can also be used to create a bag stack 6 from filled normal bags 1 and filled special bags 2. The special bags 2 can be inserted into the conveying path 3 in particular by an intermediate storage unit 15 in such a way that the special bags 2 are transferred directly into the stacking unit 110. In addition or alternatively, it is conceivable that the special bags 2 are returned from the intermediate storage unit 15 to the conveyor unit 13 of the conveying device 10. In order to be temporarily stored in the intermediate storage unit 15, the special bags can also be transferred from a supply unit 14 to conveying path 3. For example, a transfer means may be provided on the supply unit 14 and/or on the conveyor unit 13 by means of which the special bags 2 can be introduced from the supply unit 14 into the conveyor path 3 at a first delivery area 21. The supply unit 14 is configured to be revolving, whereby the filled special bags can be fed in at a feeding area 20 by a special feeding station 104, i.e. can be transferred to the supply unit 14 for transport. Thus, filled special bag 2 can be produced independently of the production of filled normal bags 1 and can be conveyed in a circle by the supply unit 14 until a corresponding demand arises. Furthermore, the circulating supply unit 14 offers the advantage that additional conveying paths 3', 3" can be operated by the supply unit 14 with special bags 2 at a second and/or third delivery area 22, 23. Two additional production lines for bag stacks 6' and 6" an as well as additional stacking areas 106, 107 are planned. Another secondary bags can be fed into the additional conveying path 3' by means of an additional feeding station 102. Preferably, the conveying device 10 can have additional conveying units 13.1, 13.2 for the training of at least one part of each of the addition conveying paths 3', 3'" The secondary bags 1' can preferably be configured like the normal bags 1 or have a different format to the normal bags 1. An additional feeding station 103 is also planned, through which an additional conveying path 3" for conveying tertiary bags 1" to an additional stacking area 107 with filled special bags 2 can be operated. The additional stacking areas 106, 107 can each be configured so that the additional stacks of bags 6', 6" can each be generated automatically by additional stacking units 120, 130. Thus, the conveying device 10 may be arranged to serve a plurality of production lines on bag stacks 6, 6', 6", whereby a single special feeding station 104 may be arranged to fill the special bags 2 and insert them on the supply unit 14, whereby the supply unit 14 is arranged to transport the special bags 2 according to a need for conveying paths 3, 3', 3". As an option, an intermediate storage unit 15,15,' 15" can be arranged next to each conveying path 3, 3', 3", so that the special bags 2 can also be temporarily stored after the special bags 2 have been inserted into the supply unit 14 in the conveying paths 3, 3', 3". It is therefore not necessary to convert feeding stations 101, 102, 103 to the production of special bags 2 or to completely pre-produce the special bags 2 in correspondingly large quantities in order to be able to serve a certain number of bag stacks.

FIG. 5 also shows completed stacks of bags 6, 6', 6" each below a sliding table 116, 116', 116" of the stacking units 110, 120, 130 of the third embodiment. Different layers of normal bags L1, L2, L3 or secondary bags L1', L2', L3' or tertiary bags L1", L2" and L3" are stacked. In addition, the top layer, i.e. the last layer in the production method, the end of the bag stack 6, 6', 6", is produced as a special layer LS from special bags 2. This creates lifting recesses 9 in the side areas of bag stacks 6, 6' and 6", through which bag stacks 6, 6' and 6" can be lifted after turning. Thus, the special layer LS can be configured in such a way that a standardized forklift truck can intervene in the lifting recesses 9 of the special layer LS to lift the respective bag stack 6, 6', 6".

For the automated formation of different layers of a bag stack 6, the stacking unit 110 of the third embodiment also features a sliding device 113 as shown in FIG. 6. Preferably the stacking unit of the first and/or the second embodiment and/or the additional stacking units 120, 130 of the third embodiment also comprises a sliding device 113 constructed in such a way. In addition or alternatively, however, for stacking, for example, it can also be provided that a manual operation is performed or the layers are formed by means of a robot arm. In the embodiment of a system 100 according to invention shown in FIG. 6, a stacking unit 110 is arranged on a conveying device 10 for conveying normal bags 1 and special bags 2. The filled bags 1, 2 are conveyed from the conveying device 10 to a sliding surface 115, under which the filled bags 1, 2 are slid onto a sliding table 116 by a slide 114. The sliding table 116 is configured to open so that a layer formed on the sliding table 116 is arranged in the stacking area 105, in particular on layers formed under the sliding table 116, preferably by gravity conveying. Alignment means 117 of the sliding device 113 can preferably be provided for forming the layer. Furthermore, the intermediate unit 15 is also arranged on the sliding surface 115, so that the special bags, which can be introduced into the conveying path 3 in the area of the stacking unit 110, can also be conveyed further by the slide 116. As described above, however, it is also possible, in addition or alternatively, that an intermediate unit is not provided or the special bags 2 are transferred by the intermediate storage unit 15 to the conveying device 10 before the special bags 2 reach the stacking unit 110.

FIG. 7 and FIGS. 8a-k show a method 200 according to the invention in a fourth, additional embodiment. The method is shown schematically in FIG. 7. FIGS. 8a-k show individual method steps in more detail. As shown in FIG. 8a, a filling of 201 of an unfilled normal bag 1.1 into a filled normal bag 1 is planned within the framework of method 200. This is preferably performed in a feeding station 101. FIG. 8b further shows the introduction 202 of filled normal bags 1 into a conveying path 3 for conveying the filled normal bags 1 from a feeding station 101 to a stacking area 105 along at least part of the conveying path 3. After the introduction of the filled normal bags 1 into the conveying path 3, a conveying device 10 additional conveys 203 of the filled normal bags 1 along the conveying path 3 to a stacking area 105. FIG. 8c further shows the formation 204 of a first layer LS, the first layer LS consisting of at least two rows of filled normal bags 1 being arranged on a sliding table 116 and subsequently being formed by gravity when the sliding table 116 is opened as the lowest layer in the stacking area 105. In according with FIG. 8d, a formation 205 of a second layer L2 on the first layer L1 in the stacking area 105 with filled normal bags 1 occurs, whereby the second layer L2 is formed analogously to the first layer L1 and arranged on it. Parallel to the processing of the normal bags 1 or after the processing of the normal bags 1, a transfer 206 of at least one special bag 2 into the conveying path 3 is also provided as shown in FIG. 8e. This can be ensured by a supply unit 14. Preferably, the special bags 2 can also be filled analogously to the filling of normal bags according to FIG. 8a before they are inserted into conveying path 3. According to FIG. 8g, the special bag 2 previously inserted in conveying path 3 is also to be removed 208 from conveying path 3, with subsequent intermediate storage 209 of the special bag 2 with additional special bags 2 in an intermediate storage unit 15. The intermediate storage 209 can, for example, be performed as slow transport along the intermediate storage unit 15. If a special layer LS is required in the stacking area 105, an insertion 210 of the special bag 2 into the conveying path 3 is performed again, so that this can be part of a special layer LS according to FIG. 8h. The special layer LS can also be formed by first pre-forming the special layer LS on the sliding table 116 in the stacking area 105 and then applying it to the already stacked layers of normal bags L1, L2, L3. Previously, according to FIG. 8f, a detection 207 of a need for special bags 2 can be provided, whereby the need of a control unit 30 is reported to the conveying device 10 or the system 100, whereby for example a sliding device 113 can have a communication means. The requirement can be provided, for example, if sufficient layers L1, L2, L3 of normal bags 1 are formed for a bag stack 6 in stacking area 105. Then, as shown in FIG. 8i, an at least partial wrapping 212 of bag stack 6 with a film 7 can be performed by means of a wrapping device 112, as shown in FIG. 8i, which can in particular be applied to bag stack 6 as a stretch hood. According to FIG. 8j, a turning 213 of bag stack 6 together with film 7 can then be performed, so that a previously top layer forms a bottom layer of the bag stack after turning 213 and thus lifting recesses 9 are provided at the special layer LS in the lower area of bag stack 6 and furthermore the bag stack 6 can be at least partially wrapped again with an additional film 7 in a new wrapping 212 by means of the wrapping device 112, for example. The other film can also be configured as a stretch hood. The latter is shown in FIG. 8k. Parallel and analogous to the treatment of normal bags 1 according to FIGS. 8a-k, secondary bags and/or tertiary bags 1' or 1" can be processed in an additional stacking area 106 or in additional stacking areas 106, 107. This can preferably be done parallel to the processing of normal bags 1 or after the processing of normal bags 1. In particular, the latter can be done, for example, in a system for stacking filled bags 1, 2 according to the third execution example. As further shown in FIG. 7, preferably in parallel, filling 201.1 of previously unfilled secondary bags, introducing 202.1 of the filled secondary bags 1' into an additional conveying path 3', conveying 203.1 of the secondary bags 1' to an additional stacking area 106, forming 204.1, 205.1 of a first and a second layer of filled secondary bags 1' and introducing 206.1 of at least one special bag 2 into the additional conveying path 3' and forming 211.1 can be provided. Steps 201.1 to 206.1 and 211.1 can be executed in the same way as steps 201 to 206 and 211, respectively, described above. In addition, a method 200 according to the invention can be performed according to the embodiments of FIGS. 8a-k by means of a conveying device or a system of the first and/or second embodiment.

As already described above, FIGS. 8 I-K show an advantageous possibility of a result of the method according to the invention. Thus, the bag stack 6 has different layers L1, L2, L3, LS from filled normal bags 1 and filled special bags 2. The layers of normal bags 1, L1, L2, L3 were formed first according to the FIGS. 8I and 8J. Thus, a bottom layer of the bag stack 6 is formed by the first layer L1 of at least two rows of filled normal bags 1 and the top layer of the bag stack 6 is formed by a special layer LS of special bags 2. Thus, the bag stack 6 in the area of its top layer has lifting recesses 9 on the sides through which the bag stack 6 can preferably be lifted by a standardized forklift truck. Furthermore, a wrapping device 112 of a stacking unit 110 can at least partially wrap the bag stack 6 with a film 7. In the example shown, the film 7 forms a stretch hood so that the bag stack 6 is at least partially protected against environmental influences from above. Furthermore, the stack can be rotated by a turning device 111 of the stacking unit 110 in such a way that a previously top layer forms a bottom layer of the bag stack 6. This is shown in FIG. 8K. This means that on the one hand the bag stack 6 can also be wrapped from the lower side with a stretch hood made of film 7, so that it is completely or largely protected against environmental influences. In addition, this strengthens load securing in relation to the stacked bags. If, as shown, the bag stack is configured in such a way that the special layer LS is brought onto the stack as the last layer and then turned, this has the advantage that the lifting recesses 9 are conveyed in a single turning step to the bottom of the bag stack 6, so that the bag stack 6 can be lifted at the lifting recesses 9, whereby at the same time a large part of the weight of the bag stack 6 is carried by the lifting recesses 9 and only the middle part loads on the film 7.

The method steps of method 200 can be performed successively or at least partially in parallel. The sequence of the method steps described corresponds to a preferred sequence, although various other possible combinations can be advantageous. In particular, individual or all method steps can be repeated.

The above explanations and embodiments describe the present invention exclusively within the framework of examples. Of course, individual features of the design can be freely combined with each other, if technically reasonable, without leaving the scope of the present invention.

REFERENCE CHARACTER LIST 1 normal bag
1' secondary bag
1" tertiary bag
1.1 unfilled normal bag
2 special bag
3 conveying path
3', 3" additional conveying pathway
6 bag stack
7 film
10 conveying device
11 first conveying device
12 second conveying device
13 conveyor unit
13.1, 13.2 additional conveying units
14 supply unit
15 intermediate storage unit
15.1 first delivery means
15.2 second means of transfer
20 feeding area
21 first delivery area
22 second delivery area
23 third delivery area
30 control unit
31 sensor unit
100 system
101 feeding station
102, 103 additional feeding stations
104 special feeding station
105 stacking area
106, 107 additional stacking area
110 stacking unit
111 turning means
112 Wrapping device
113 sliding device
114 slider
115 sliding surface
116 sliding table
117 aligning means
118 filling device
120, 130 Additional stacking unit
L1 first layer
L2 second layer
L3 third layer
LS special layer
L1', L1" additional first layer
L2', L2" additional second layer
L3', L3" additional third layer

The invention claimed is:
1. A conveying device for conveying filled bags, comprising:
a feeding station for filling normal bags, and
a conveying unit, by means of which at least part of a conveying path for conveying filled normal bags from the feeding station to a stacking area can be configured,
wherein a supply unit is provided, from which filled special bags can be fed into the conveying path, so that a bag stack can be produced in the stacking area from filled normal bags and filled special bags,
wherein special bags are bags of a format that has been modified in comparison with normal bags,
wherein the bag stack formed from filled normal bags and filled special bags have different stack patterns in a layer of filled special bags in comparison with a layer of filled normal bags,
so that the bag stack with recesses can be provided which are suitable for receiving the bag stack by a fork lift truck without pallets,
wherein a control unit is provided identifying a need for filled special bags in the stacking area so that sufficient layers of filled normal bags are formed in the stacking area and that a layer of special bags is then to be formed, and
wherein a special feeding station for filling previously unfilled special bags and for introducing the filled special bags into the supply unit is arranged on the supply unit of the conveying device.

2. The conveying device according to claim 1, wherein
the filled special bags can be stored in an intermediate storage unit, the intermediate storage unit being arranged on the conveying unit in such a way that the filled special bags can be fed to the intermediate storage unit from the conveying path.

3. The conveying device according to claim 2, wherein
the intermediate storage unit is configured for storing the filled special bags in one level, and/or wherein the filled special bags can be transferred from the intermediate storage unit directly to the stacking unit or to the conveying unit in the conveying path.

4. The conveying device according to claim 1, wherein
the control unit is configured such that the need for filled special bags can be triggered if a predefined target parameter is reached in the stacking area, wherein the predefined target parameter is a weight of the bags already stacked or a number of bags already stacked.

5. The conveying device according to claim 1, wherein
a sensor unit is arranged on at least the conveying unit or on the intermediate storage unit, wherein through the sensor unit the filled special bags can be identified, and wherein at least the supply unit, the conveying unit or the intermediate storage unit comprise at least a conveyor belt or a roller conveyor.

6. The conveying device according to claim 1, wherein
the supply unit has a circulating conveying means, comprising a feeding area for receiving the filled special bags and at least one first delivery area for transferring the filled special bags into the conveying path.

7. The conveying device according to claim 6, wherein
the supply unit has at least one second delivery area.

8. The conveying device according to claim 1, wherein
the conveying device has at least one additional conveying unit to which at least one additional stacking unit can be arranged for producing an additional bag stack.

9. A system for stacking filled bags, the system comprising:
a feeding station through which filled normal bags can be fed into a conveying path for conveying the filled normal bags from the feeding station to a stacking area,
a conveying device, which is arranged at the feed station so that at least part of the conveying path is formed by a conveying unit of the conveying device, and a stacking unit which is arranged on the conveying device and by means of which a bag stack can be created, wherein the conveying device has a supply unit, from which filled special bags can be fed into the conveying path, so that in the stacking area the bag stack can be created from filled normal bags and filled special bags, wherein special bags are bags of a format that has been modified in comparison with normal bags, wherein the bag stack formed from filled normal bags and filled special bags have different stack patterns in a layer of filled special bags in comparison with a layer of filled normal bags, so that the bag stack with recesses can be provided which are suitable for receiving the bag stack by a fork lift truck without pallets, wherein a control unit is provided identifying a need for filled special bags in the stacking area so that sufficient layers of filled normal bags are formed in the stacking area and that a layer of special bags is then to be formed, and wherein a special feeding station for filling previously unfilled special bags and for introducing the filled special bags into the supply unit is arranged on the supply unit of the conveying device.

10. The system according to claim 9,
wherein
the feeding station has a filling device by means of which previously unfilled normal bags can be filled, and/or wherein at least one additional feeding station, through which secondary bags can be filled, or at least one additional stacking unit for producing an additional bag stack is arranged on the conveying device.

11. The system according to claim 9,
wherein
at least the conveying device or the stacking unit has a control unit by means of which a need for filled special bags in the stacking area can be identified.

12. The system according to claim 9,
wherein
the stacking unit has a turning means by means of which the bag stack can be rotated in such a way that a previously top layer of the bag stack forms a bottom layer of the bag stack after the rotation by the turning means.

13. The system according to claim 9,
wherein
the stacking unit has a wrapping device, by means of which the bag stack can be wrapped at least partially with a film, and wherein the stacking unit has a sliding device, by means of which part of the conveying path is formed, the sliding device having a slider, by means of which the filled bags can be conveyed from a sliding surface onto a sliding table.

14. A method for stacking filled bags to a bag stack, comprising the following steps:
introducing filled normal bags into a conveying path by a feeding station for conveying the filled normal bags from the feeding station to a stacking area,
conveying the filled normal bags along a part of the conveying path to the stacking area by a conveying device,
forming a first layer of at least two rows of filled normal bags in the stacking area, and
forming at least one second layer of at least two rows of filled normal bags on said first layer,
wherein
at least the following steps are foreseen:
inserting at least one special bag into the conveying path by a supply unit, wherein a special feeding station for filling previously unfilled special bags and for introducing the filled special bags into the supply unit is arranged on the supply unit of the conveying device, and
forming a special layer from at least one special bag in the stacking area,
wherein special bags are bags of a format that has been modified in comparison with normal bags, and
wherein the bag stack formed from filled normal bags and filled special bags have different stack patterns in a layer of filled special bags in comparison with a layer of filled normal bags,
so that the bag stack with recesses can be provided which are suitable for receiving the bag stack by a fork lift truck without pallets.

15. The method according to claim 14,
wherein
the method comprises the step of:
turning the formed layers of the bag stack so that a previously top layer after turning forms a bottom layer of the bag stack.

16. The method according to claim 14,
wherein
the special layer is formed as a last layer of the bag stack, and/or wherein the bag stack is of cuboid-like configuration and the formation of the special layer comprises an arrangement of the filled special bags in such a way that at least on two sides, preferably on four sides of the bag stack, in each case a lifting recess is produced.

17. The method according to claim 14,
wherein
the method further comprises at least one of the following steps:
wrapping of the bag stack with a film, and
identifying a need for at least one special bag.

18. The method according to claim 14,
wherein
the following steps are performed:
conveying filled secondary bags along an additional conveying path to an additional stacking area,
forming a first layer of at least two rows of filled secondary bags in the additional stacking area,
forming at least one second layer of at least two rows of filled secondary bags on the first layer of filled secondary bags,
inserting at least one special bag into the additional conveying path, and
forming a special layer from at least one special bag in the additional stacking area, and/or wherein the method comprises the following steps:
removing the special bag from the conveying path,
intermediate storage of the special bag, and
re-inserting the special bag into the conveying path.

* * * * *